United States Patent Office 3,554,030
Patented Jan. 12, 1971

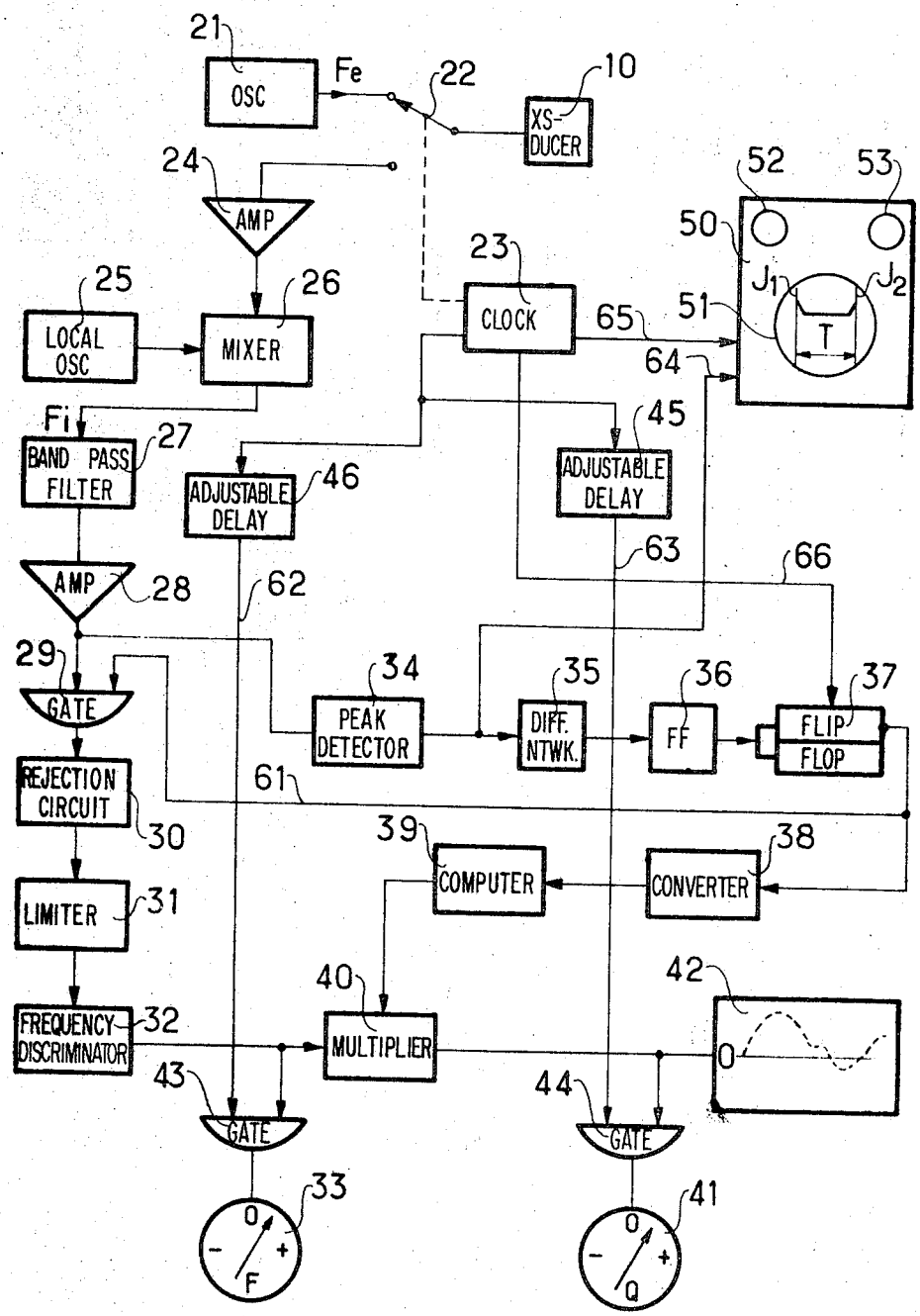

3,554,030
RECORDING ULTRASONIC FLOWMETER FOR BLOOD VESSELS
Pierre Peronneau, Paris, France, assignor to Compagnie Generale d'Electricite, Paris, France, a corporation of France
Filed Apr. 8, 1968, Ser. No. 719,591
Claims priority, application France, Apr. 7, 1967, 102,018
Int. Cl. G01p 5/00
U.S. Cl. 73—194
7 Claims

ABSTRACT OF THE DISCLOSURE

A flowmeter, especially for use in measuring and recording the volume rate of blood flow, in which a single ultrasonic transducer is alternately used as emitter and receiver of ultrasonic waves. The transducer is used to measure echos indicating the size of the blood vessel and the speed of the blood flowing in the vessel. By calculation, the volume rate of flow is derived.

BACKGROUND OF THE INVENTION

Field of the invention

The present invention relates to an apparatus whereby it is possible to measure with a single ultrasonic transducer both the diameter of a conduit through which a fluid is flowing, and the speed of the fluid flow and to determine from these measured values the volume rate of flow, which can be applied to a recording apparatus. The preferred application is for measurement of the rate of blood flow, particularly in human beings. The use of a single transducer reduces to a minimum the trauma caused by the introduction of the transducer onto the blood vessel itself.

Description of the prior art

It is known to use ultrasonic devices for measurement of the speed of a liquid flow in general. These devices, most of which use two transducers, or sometimes a single transducer, use the Doppler effect. Devices are also known which apply the same principle to blood flow rate measurement. The known devices are speed meters; see particularly the articles by Franklin and collaborators in "The American Journal of Medical Electronics" 1st term 1966, pages 24–28 and "IRE Transactions on Bio-medical Electronics," January 1962, pages 44–49. All of the devices known in the field of ultrasonic measurement of blood speed use two transducers. The known devices determine the speed of the blood, not the volume rate of flow. A flowmeter operating from the exterior of a conduit must necessarily carry out two measurements—a measurement of cross-sectional area (in fact a diameter measurement in a cylindrical conduit) and a measurement of speed. The volume flow rate is obtained, with a suitable scale factor, by multiplying the square of the diameter by the speed.

SUMMARY OF THE INVENTION

This invention determines directly the instantaneous volume flow rate in a blood vessel, for example in millilitres per minute. More particularly, the invention plots the curve of the blood flow rate during a pulsatory cycle. The instantaneous value is actually determined as a mean value during an interval which is very short relatively to the period of a pulsatory cycle, for example, less than one part in a hundred.

According to the invention, an ultrasonic flowmeter for blood vessel uses a single transducer serving at one time to emit a high-frequency pulse wave and at another time to receive an echo. This flowmeter comprises, in functional combination, means for measuring the time T which elapses between a first echo on the entry surface of the said wave into the blood vessel and a second echo on the exit surface from the blood vessel, means for measuring the Doppler effect frequency deviation $\Delta$ undergone by the echo of the wave on moving the red corpuscles, $\Delta$ being measured in magnitude and in sign, means for calculating the instantaneous volume flow rate corresponding to an individual pulse of the form $Q = k \cdot T^2 \Delta$, where $k$ is a constant, and means for recording the curve of the volume flow rates during at least one pulsatory cycle in magnitude and in sign.

The ultrasonic wave transmitted through the vessel wall by a transducer penetrates into the vessel, is propagated in the blood, reaches the other side of the wall of the envelope, and is reflected back towards the transducer. The reflected wave exhibits characteristic irregularities at the first passage from wall to blood and on the second passage from blood to wall. The thickness of the blood flow channel traversed is determined by measuring the time which elapses between these irregularities. Hence, knowing the inclination between the beam emitted and the axis of the vessel, the diameter D of the vessel can be determined.

Furthermore, the wave segments which are reflected by the red corpuscles moving at a certain speed U are subjected to a frequency deviation, caused by the well known Doppler effect.

From the information on the diameter D determined by measurement of the propagation time T through the cross-section of the blood vessel, and from the information on the speed U given by the measurement of the frequency deviation $\Delta$, appropriate calculating means supply a value proportional to the instantaneous flow rate $Q = k \cdot T^2 \Delta$, where $k$ is a constant, by squaring the value T and multiplying by the value $\Delta$. These calculating means may be of any known type, analog, digital, or hybrid.

The rate of emission of the high-frequency pulses is sufficiently rapid to allow calculation of a large number of values of the volume flow rate during the course of a pulsatory cycle. This means that a recording apparatus receiving the calculated instantaneous volume flow rate values can trace the curve of the flow rate during the pulsatory cycle with good definition.

Furthermore, with the means for detecting the Doppler effect frequency devation $\Delta$ supplying the algebraic value of the speed of the blood, both in magnitude and in sign, the flow rate curve traced faithfully reproduces the portions of the cycle where the flow rate is reversed. An apparatus which does not supply an indication of the direction of delivery, therefore gives an incorrect idea of the real pulsatory phenomenon. The apparatus according to the present invention is, however, a valuable instrument for biological investigation.

The transducers which can be used in blood flow rate measurement are of two primary types:

(1) Perivascular transducers. A small piezoelectric ceramic plate is contained in a channel made of a substance (for example methacrylate resin) which ensures good acoustic impedance. The channel is placed on the periphery of the vessel being measured. Under these conditions, the diameter of the vessel is fixed. Its variations during the course of a systolic period are imperceptible. Measurement of the rate of flow is then approximately equivalent to the measurement of the speed. The diameter of the vessel is known because it is the diameter of the channel.

(2) Transcutaneous transducers. The transducer is placed on the epidermis, and it is contained in a cavity which contains a gel ensuring acoustic coupling between the piezoelectric ceramic and the epidermis.

Intravascular transducers are also known, using the catheter technique. In this case, a transducer placed at the end of a probe, perpendicular to the direction of flow, gives the value of the speed but does not supply any information regarding the diameter.

In the general case, therefore, the measurement of the instantaneous blood flow rate must result from a calculation based on a measurement of the instantaneous diameter and a measurement of instantaneous speed.

An experimental study of the particular conditions has led to the adoption of the following values for the parameters of the measuring process, these being given solely by way of example:

Frequency of oscillation $f$ is 5 to 10 mc./s.
Duration of emission pulse $\tau_1$ is 3 to 4 $\mu$s.
Period of recurrence $T_R$ is between $1.25 \cdot 10^{-4}s$ and $2.5 \cdot 10^{-3}s$ (that is, a pulse frequency between 400 and 8,000 c./s.).

Power of emission has values of about 100 mw./cm.$^2$, which are generally admitted.

A large period of recurrence makes it possible to increase the energy emitted per pulse, while retaining a mean safety value.

If a low value is taken for the recurrence period, the signal/noise ratio is reduced. In this case in order to make advantageous use of the incoherence of the noise and the coherence of the signal received on some successive measurements, it is advantageous to use a summation of the echo in a tapped delay line.

In some cases, the duration of the emission which is best for measuring the diameter is different from the duration which is best for speed measurement. In this case, the apparatus is equipped with a double adjustment of the emission duration, with alternative change-over from one value to the other.

BRIEF DESCRIPTION OF THE DRAWINGS

The invention will be described in detailed manner with reference to the accompanying drawings wherein.

FIG. 2 shows a diagram of an apparatus for measuring blood flow rate according to the invention.

DESCRIPTION OF THE PREFERRED EMBODIMENTS

Figure 1:
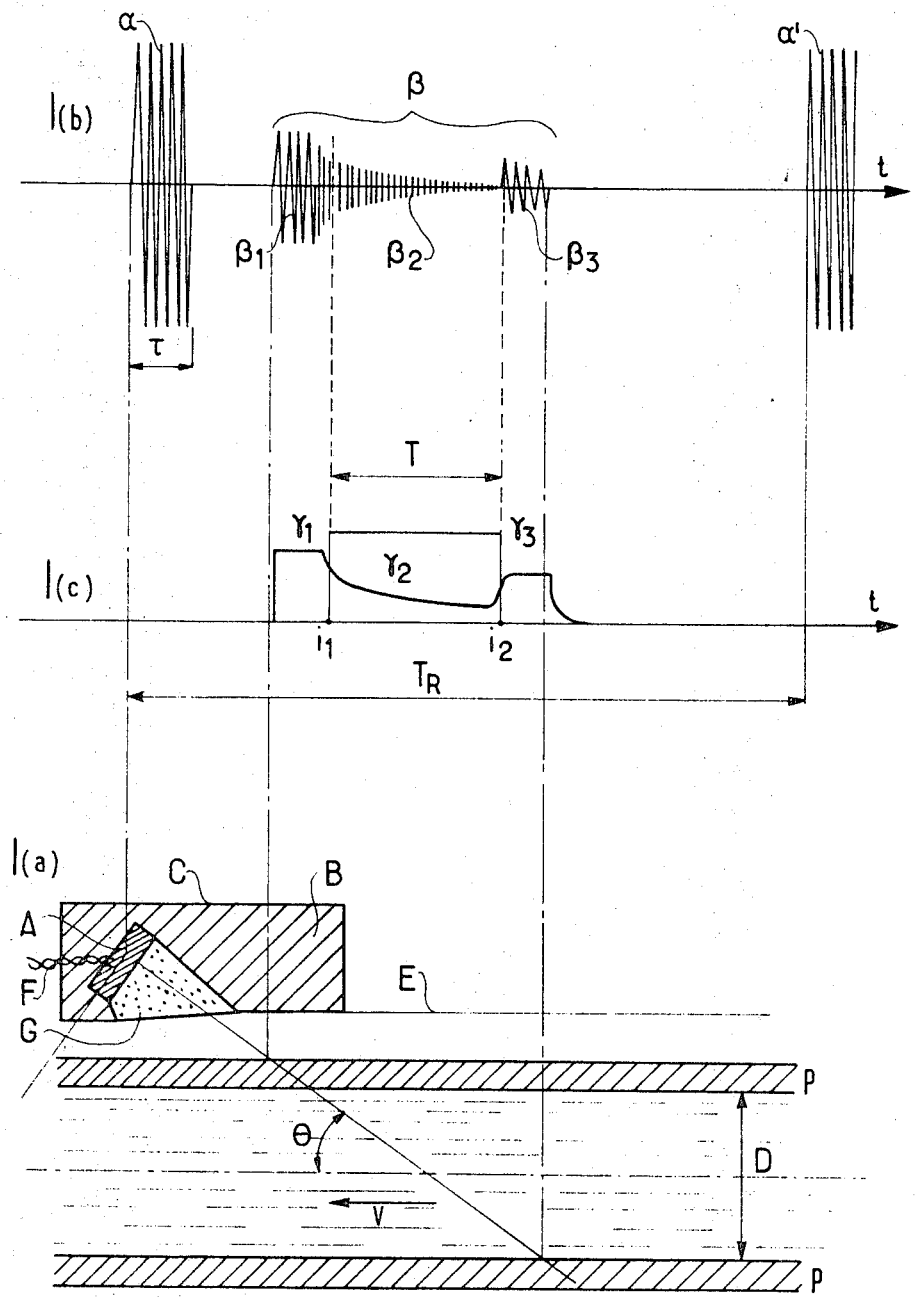
FIG. 1 is a diagram in parts $a$, $b$ and $c$, which shows the basic principle of the apparatus according to the invention.

FIG. 1($a$) shows diagrammatically the arrangement of the transducer C which emits a beam of vibrations which passes at an angle $\theta$ through a blood vessel of wall thickness $p$ and of diameter D, where the blood flow rate has an axial speed $v$.

The transducer comprises a piezoelectric ceramic plate A (for example made of lead titanate-zirconate) contained in a molded body B (for example made of methacrylate resin) which is applied to the epidermis E. An acoustic coupling material (for example oil, or agar-agar) adjusts the acoustic impedances between the ceramic and the tissues. The plate A can be electrically energized by two wires F.

The angle $\theta$ is known by construction.

The graph of FIG. 1($b$) shows on a scale of time $t$ at time $\alpha$ an ultrasonic pulse of duration $\tau$, emitted by the transducer. At $\beta$ is shown a train of waves received by reflection at the transducer while operating as a pickup. The reflected wave train $\beta$ is composed of three portions:

(1) a portion $\beta_1$ due to reflection from the entry surface of the liquid medium.

(2) a portion $\beta_2$ due to reflection from the red corpuscles of the blood, the duration of which T is proportional to $$1 = \frac{D°}{\sin \theta}$$

(3) a portion $\beta_3$ due to reflection from the exit surface of the liquid medium.

The train $\beta_1$ has an approximately constant amplitude; similarly the train $\beta_3$ has an approximately constant amplitude, less than that of $\beta_1$. The train $\beta_2$ has an amplitude which decreases in the course of time T with a sudden diminution between $\beta_1$ and the beginning of $\beta_2$, and a sudden increase again between the end of $\beta_2$ and $\beta_3$.

At the end of the time $T_R$ a new pulse $\alpha^8$ is emitted.

The graph of FIG. 1($c$) shows an electrical signal obtained by peak detection applied to the train of reflected waves $\beta_2$. This signal contains a first plateau $\gamma_1$, a second plateau $\gamma_3$ and an intermediate portion $\gamma_2$ between two inflections $i_1$ and $i_2$.

FIG. 1 shows the phenomenon in diagrammatic form. In reality, the reflected waves are accompanied by considerable noise. As pointed out hereinbefore, means exist to increase the signal-noise ratio by using the coherence of the signal and the incoherence of the noise.

The waves which are reflected by the red corpuscles, that is to say the waves $\beta_2$, have a frequency modified by the Doppler effect. Of course, at a given instant, the speed of the red corpuscles, or the speed of the blood flow, is not the same throughout the entire cross-section of the vessel. It is higher on the axis and lower in the vicinity of the wall. The measurement of Doppler effect is carried out by means of a discriminator centered on the emission frequency $F_e$ (that is to say sensitive to the frequency deviation) which gives a mean value. The frequency discriminator, which gives a signal of one polarity or of the reverse polarity depending on whether the frequency deviation is in one sense or the other relative to the median frequency, may be replaced by any other combination giving a similar result.

In FIG. 2, an oscillator 21 can emit a wave of frequency $F_e$ for example 10 mc./s.

Element 22 is a switch with recurrent frequency of period $T_R$ controlled by a time base 23, which applies the wave of frequency $F_e$ to a transducer 10 during the time $\tau$ and then connects the transducer 10 to a reception device during the remainder of the recurrence period $T_R - \tau$. The rate of switching is given by a clock or time base 23. The switch is drawn as a mechanical element, but of course, it will be understood that in fact it is an electronic switch.

The reception device comprises an amplifier for the incident frequency $F_e$ 24, which is followed preferably by a mixer 26 supplied with the amplified incident frequency and with a frequency supplied by a local oscillator 25. There issues from the mixer 26, after a band pass filter 27, a spectrum centered on an intermediate frequency $F_i$ which may be for example 1 mc./s. The wave train of central frequency $F_i$ is amplified by an amplifier 28, the output current of which is divided into two branch circuits.

In a first branch, the current of intermediate frequency $F_i$ issuing from the amplifier 28 is detected in a peak detector 34 whose output current is applied to a differentiating network 35. The inflection $i_1$ mentioned hereinbefore gives rise to a first pulse which is shaped by a Schmitt flip-flop 36. Likewise, the inflection $i_2$ gives rise to a second pulse which is also shaped by the flip-flop 36. A first pulse ($I_1$) issuing from the Schmitt flip-flop 36 brings into operation a bistable flip-flop 37. The second pulse ($I_2$) returns the flip-flop 37 to the condition of rest. A connection 66 with the clock 23 causes the return to zero of the flip-flop before each emission.

A converter 38 of known type is connected to the output of the flip-flop 37 to supply an output voltage $V_1 = k_1 \cdot T$, T being the time interval which separates the pulses $I_1$ and $I_2$. A computing unit 39 receives the voltage $V_1$ at the input side and delivers a voltage $V_2 = k_2 \cdot T^2$ at the output side.

At the output of the amplifier 28, a second branch comprises an AND gate 29, one input of which is connected by a line 61 to the output of the said bistable flip-flop 37.

A rejector circuit 30, centered on $F_i$, eliminates the low-frequency Doppler effect corresponding to the pulsation of the vessel. A limiter 31 eliminates amplitude variations, and then the limited signal is applied to a frequency discriminator 32 or the like centered on $F_i$. The discriminator supplies at its output a demodulated frequency of a first polarity, for example negative, for a frequency deviation Δ relatively less than $F_i$, and positive for a frequency deviation relatively more than $F_i$. A voltage $V_3$ issues from the discriminator 32 or the like which is proportional to the instantaneous speed U of the blood in magnitude and in sign.

A central-zero indicator apparatus 33, connected to the output of the discriminator 32, makes it possible to measure the instantaneous speed U at any point of the pulsatory cycle. For this purpose, the demodulated voltage is admitted to the indicator apparatus 33 by means of an AND gate 43 which receives also a synchronization pulse coming from the clock 23 through an adjustable delay unit 46 and via line 62.

The voltage $V_3 = k_3 \cdot U$ and the voltage $V_2 = k_2 \cdot T^2$ are respectively applied to two inputs of a multiplier 40 to supply as the multiplier output a voltage $V_4 = k_4 \cdot Q$, proportional to the instantaneous flow rate. This value $V_4$ can also be monitored point by point by means of a central-zero indicator apparatus 41, to receive $V_4$ connected through an AND gate 44, which receives a synchronization pulse via line 63 from a second adjustable delay unit 45, in which the synchronization pulse is subjected to an optionally variable delay. If appropriate, the two delay units 45 and 46 can be replaced by a single unit which simultaneously controls the opening of the two gates 43 and 44.

The voltage $V_4$ is also applied to the input of a recording apparatus 42 which provides a recording of the pulsatory volume flow rate, which rate may have a positive portion and a negative portion, as shown in the illustration.

A cathode ray oscilloscope 50 can be connected to the output of the detector 34 by a line 64, or if appropriate, to the output of the amplifier 28. This oscilloscope 50, which may be synchronized by clock 23 through a line 65, can be equipped by means well known in the oscilloscope art, with two luminous indices $J_1$ and $J_2$, the position of which can be regulated by means of two regulating knobs 52 and 53. One of the knobs can be graduated in intervals of time separating $J_1$ and $J_2$, the duration T being read directly from the graduation.

By manipulating the knobs 52 and 53 of the oscilloscope 50, the operator can make the indices $J_1$ and $J_2$ coincide on the screen 51 with the inflections $i_1$ and $i_2$ respectively of the visualized received signal. This coincidence permits a measurement of time T in accordance with the setting of the knob 53.

The apparatus diagram given hereinbefore has been given simply by way of example. Within the framework of the invention many variants, modifications and additions are possible. More particularly, the calculating processes can be arranged differently, and the measurement of time can be carried out by known entirely analog means, for example charged by a condenser with a sawtooth current.

The invention also extends to a variant wherein the measurement of the diameter and the measurement of the speed are carried out at two times, with two different emission durations, and storage of the values which are to be multiplied.

What is claimed is:

1. A recording ultrasonic flowmeter for measuring the volume rate of flow of blood flowing in a blood vessel comprising
   (a) a single ultrasonic transducer serving at alternate times for the emission of a high-frequency pulse wave toward said blood vessel and for the reception of echo waves from said blood vessel,
   (b) time means responsive to said echo waves for measuring the time T which elapses between the reception of a first echo wave from the surface of said vessel through which said wave entered said vessel and the reception of a second echo wave from the surface of said vessel through which said wave exited from said vessel and for generating a time signal representing said time T,
   (c) frequency deviation means responsive to said echo waves for measuring the magnitude and sign of the frequency deviation Δ undergone by echo waves from the corpuscles flowing with said blood and for generating a frequency deviation signal representing said frequency deviation Δ.
   (d) calculator means responsive to said time signal and to said frequency deviation signal for calculating the instantaneous volume flow rate Q corresponding to information obtained from an individual emitted pulse, in which case $Q = kT^2\Delta$, where $k$ is a predetermined constant, and for generating a volume flow rate signal representing Q, and
   (e) means responsive to the volume flow rate signal for recording the curve of the volume flow rate in magnitude and in sign during at least one pulsatory cycle.

2. A recording ultrasonic flowmeter according to claim 1 wherein said time means further comprises
   (a) a detector responsive to said echo waves,
   (b) a differentiating circuit responsive to the output of said detector,
   (c) a pulse shaping circuit responsive to the output of said differentiating circuit,
   (d) a bistable flip-flop responsive to the output of said pulse shaping circuit to produce an output of a predetermined type during said time T,
   (e) converter means responsive to said output of a given type for supplying a first electrical signal proportional to said time T, and
   (f) square means responsive to said first electrical signal for generating a second electrical signal proportional to the square of said first electrical signal.

3. A recording ultrasonic flowmeter according to claim 2 wherein said frequency deviation means further comprises
   (a) first gate means responsive to said echo waves and to said output of a predetermined type for passing a signal representative of said echo waves when coincident with said output of a predetermined type,
   (b) an amplitude limiter circuit responsive to said signal representative of said echo waves, when passed by said first gate means to generate an amplitude limited signal, and
   (c) a frequency discriminator means responsive to said amplitude limited signal to generate said frequency deviation signal.

4. A recording ultrasonic flow meter according to claim 3 further comprising
   (a) delay means for producing a synchronization signal,
   (b) second gate means responsive to said synchronization signal for passing said frequency deviation signal, and
   (c) a central-zero indicating means responsive to the frequency deviation signal passed by said second gate means for providing an indication of blood speed.

5. A recording ultrasonic flow meter according to claim 3 wherein said calculator means comprises a multiplier responsive to said second electrical signal and to said frequency deviation signal for generating a multiplier output signal substantially proportional to said instantaneous volume flow.

6. A recording ultrasonic flow meter according to claim 5 further comprising (a) first delay means for producing a first synchronization signal,
(b) second gate means responsive to said first synchronization signal for passing said multiplier output signal, and
(c) a first central-zero indicating means responsive to the multiplier output signal passed by said second gate means for providing an indication of said volume flow rate.

7. A recording ultrasonic flow meter according to claim 6 further comprising
(a) second delay means for producing a second synchronization signal,
(b) third gate means responsive to said synchronization signal for passing said frequency deviation signal, and
(c) a second central-zero indicating means responsive to the frequency deviation signal passed by said third gate means for providing an indication of blood speed.

References Cited

UNITED STATES PATENTS

| 3,430,625 | 3/1969 | McLeod, Jr. | 73—194UX |
| 3,443,433 | 5/1969 | Liston et al. | 73—194 |
| 3,498,290 | 3/1970 | Shaw et al. | 73—194X |

FOREIGN PATENTS

| 925,541 | 5/1963 | Great Britain | 73—194 |

CHARLES A. RUEHL, Primary Examiner

U.S. Cl. X.R.

73—67.8; 128—2.05